United States Patent
Jung et al.

(10) Patent No.: US 11,718,069 B2
(45) Date of Patent: Aug. 8, 2023

(54) COMPOSITE FILM FOR COATING STEEL PIPE AND METHOD OF MANUFACTURING SAME

(71) Applicant: FIXON INC., Gwangyang-si (KR)

(72) Inventors: Sung Man Jung, Gwangyang-si (KR); Heung Dae Kim, Suncheon-si (KR); Jong Min Jeong, Anyang-si (KR); Kye Sung Cho, Suncheon-si (KR); Seung Gwan Lim, Suncheon-si (KR)

(73) Assignee: FIXON INC., Gwangyang-si (KR)

( * ) Notice: Subject to any disclaimer, the term of this patent is extended or adjusted under 35 U.S.C. 154(b) by 0 days.

(21) Appl. No.: 17/851,971

(22) Filed: Jun. 28, 2022

(65) Prior Publication Data
US 2023/0084163 A1 Mar. 16, 2023

(30) Foreign Application Priority Data

Aug. 26, 2021 (KR) .................. 10-2021-0112824

(51) Int. Cl.
| | | |
|---|---|---|
| *B32B 15/085* | (2006.01) | |
| *B32B 27/08* | (2006.01) | |
| *B32B 27/32* | (2006.01) | |
| *B32B 5/02* | (2006.01) | |
| *B29C 48/08* | (2019.01) | |
| *B29C 48/00* | (2019.01) | |

(Continued)

(52) U.S. Cl.
CPC .......... *B32B 15/085* (2013.01); *B29C 48/022* (2019.02); *B29C 48/08* (2019.02); *B29C 48/9135* (2019.02); *B32B 5/024* (2013.01); *B32B 15/18* (2013.01); *B32B 27/08* (2013.01); *B32B 27/32* (2013.01); *B32B 37/12* (2013.01); *B29K 2023/065* (2013.01)

(58) Field of Classification Search
None
See application file for complete search history.

(56) References Cited

U.S. PATENT DOCUMENTS

| | | | |
|---|---|---|---|
| 4,950,541 A * | 8/1990 | Tabor ................ | C08F 255/02 525/74 |
| 5,750,252 A * | 5/1998 | Danner ................ | B32B 15/18 428/457 |
| 2007/0004860 A1 * | 1/2007 | Leboeuf ................ | C08L 23/142 525/70 |

FOREIGN PATENT DOCUMENTS

| | | | | |
|---|---|---|---|---|
| JP | 2005/096320 A | * | 4/2005 | ............ B05D 7/20 |
| JP | 2005-096320 A | | 4/2005 | |

(Continued)

OTHER PUBLICATIONS

Kaneko—JP 2005-096320 A—KR D3—MT—single layer of resin on steel—2005 (Year: 2005).*

(Continued)

*Primary Examiner* — John Vincent Lawler
(74) *Attorney, Agent, or Firm* — Studebaker & Brackett PC

(57) ABSTRACT

Proposed is a composite film including a first film layer attached to an upper surface of a steel member, a second film layer positioned on the first film layer, and a mesh film layer positioned on the second film layer and having a mesh structure. A portion of the mesh film layer is embedded into the second film layer during a heat compression process when the composite film is manufactured. The composite film improves the water resistance, chemical resistance, abrasion resistance, and durability of a steel member when the steel member is coated with the composite film.

13 Claims, 1 Drawing Sheet

(51) Int. Cl.
*B29C 48/88* (2019.01)
*B32B 37/12* (2006.01)
*B32B 15/18* (2006.01)
*B29K 23/00* (2006.01)

(56) References Cited

FOREIGN PATENT DOCUMENTS

| KR | 10-0356909 A1 | 11/2005 | |
| KR | 10356909 B1 * | 11/2005 | ............... B32B 1/00 |
| KR | 10-2006-0106592 A | 10/2006 | |
| KR | 2006/0106592 A * | 10/2006 | ............... B05D 7/24 |
| KR | 10-1128765 A1 | 3/2012 | |
| KR | 101128765 B1 * | 3/2012 | ............... B32B 27/06 |
| KR | 10-1134571 B1 | 7/2012 | |
| KR | 101134571 B1 * | 7/2012 | ............... B32B 1/08 |
| KR | 10-1824002 B1 | 2/2018 | |

OTHER PUBLICATIONS

Park+Kim+Park+Min—KR 100356909 B1—IDS—MT—metal w-polyethylene coating—2005 (Year: 2005).*
Jung—KR 2006-0106592 A—KR D2—MT—2 polymer layers+ reinforcement layer+4th resin layer—2006 (Year: 2006).*
Jung—KR 101134571 B1—KR D1—MT—coated steel w-2 PE layers+mesh layer—2012 (Year: 2012).*
Jung—KR101128765 B1—IDS—MT—laminating a mesh into a film—2012 (Year: 2012).*
Fambri—Morphology+VE properties melt-spun HDPE+hydrotalcite—Polymer Composites—2016 (Year: 2016).*
Yu—mech prop silane-grafted PE-SiO2 fiber rope—Aquacult.Fish—2017 (Year: 2017).*
Min_Dat—Hydrotalcite_ Mineral information—Oct. 31, 2022 (Year: 2022).*
An Office Action mailed by the Korean Intellectual Patent Office dated Nov. 16, 2021, which corresponds to Korean Application No. 10-2021-0112824; with English language translation.

* cited by examiner

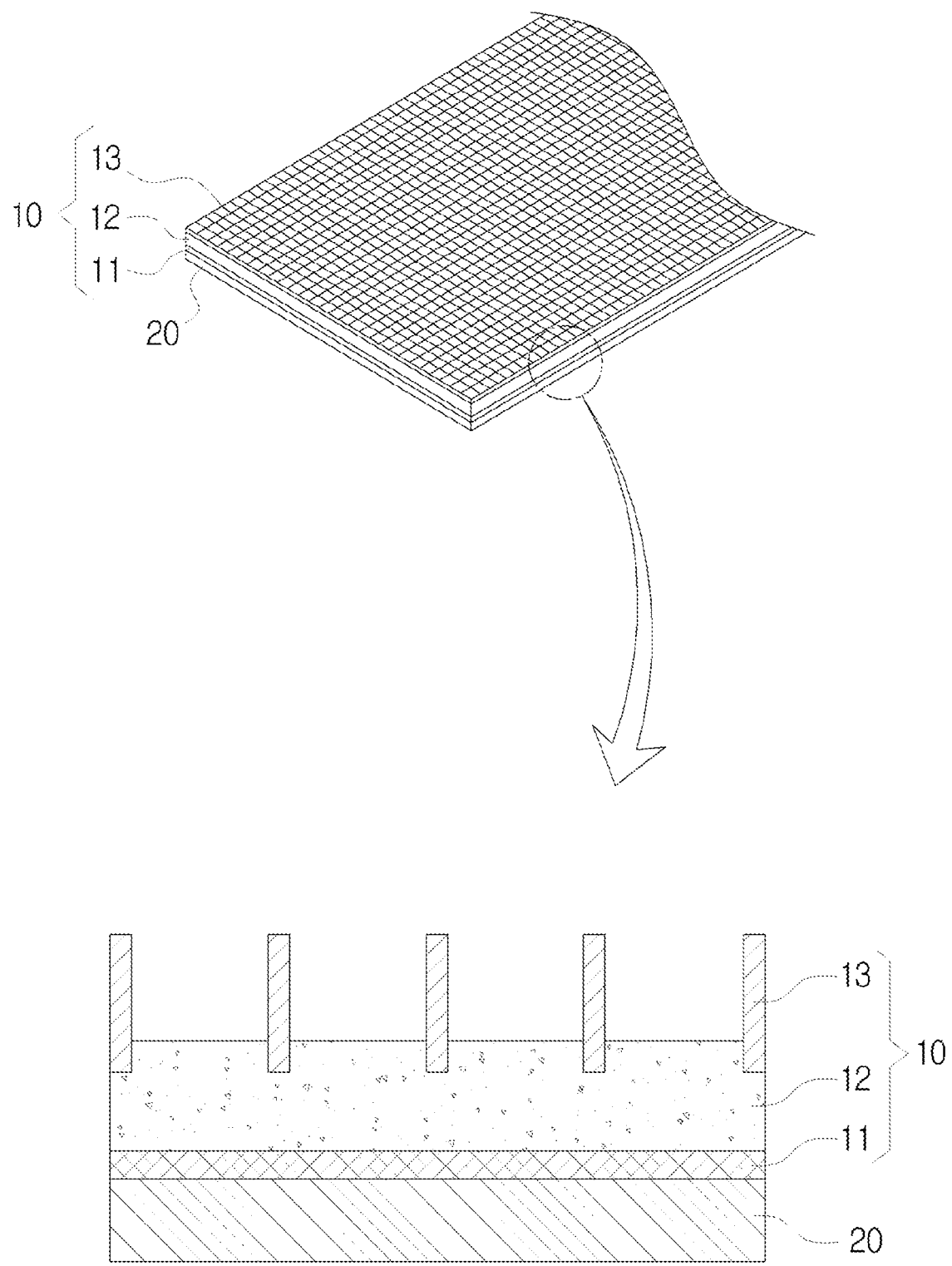

COMPOSITE FILM FOR COATING STEEL PIPE AND METHOD OF MANUFACTURING SAME

CROSS REFERENCE TO RELATED APPLICATION

The present application claims priority to Korean Patent Application No. 10-2021-0112824, filed Aug. 26, 2021, the entire contents of which is incorporated herein for all purposes by this reference.

BACKGROUND OF THE INVENTION

1. Field of the Invention

The present disclosure relates to a composite film for steel coating and a method of manufacturing the same. More particularly, the present disclosure relates to a steel-coating composite film composed of a first film layer, a second film layer, and a mesh film layer, and to a method of manufacturing the same, the composite film having improved strength, increased adhesive strength with respect to a steel pipe, and uniform quality over the entire area thereof, compared to conventional films.

2. Description of the Related Art

Steel pipes are widely used as a formwork or construction chute for the drainage of sewage and wastewater and the drainage of agricultural water and for drainage in salt sea areas, offshore construction sites, and construction fields. In particular, recently, corrugated steel pipes with high strength or resistance to ensure external pressure, structural safety, durability, economic efficiency, and workability have been in the spotlight.

Corrugated steel pipes have a shape in which valleys and crests are arranged in the longitudinal direction and continuously wound in a spiral shape. Typically, a zinc coating layer is formed on the inner and outer surfaces to improve the corrosion resistance of the corrugated steel pipe. These days, corrugated steel pipes coated with a polymer film layer such as a PE film on the zinc coating layer to improve corrosion resistance are also being used.

The conventional polymer film layer is a double film composed of an adhesive film layer for improving adhesion to the zinc coating layer and a high-strength film layer for improving strength.

However, the conventional polymer film layer having such a configuration has a problem in that the polymer film layer is weak to external impact and is low in tensile strength. Due to these disadvantages, there is a problem in that the service life of the corrugated steel pipe is reduced.

For example, during construction, the corrugated steel pipe is transported and buried in a construction site, with the use of heavy equipment such as a crane or an excavator. In this process, the outer surface of the corrugated steel pipe is scratched, scarred, or nicked by heavy equipment. Thus, damage to the corrugated steel pipe, from the polymer film layer having weak physical properties to the galvanized steel sheet underneath the polymer film layer, frequently occurs.

In addition, after the corrugated steel pipe is installed, not only wastewater but also stones and gravel are transported through the corrugated steel pipe. In this process, the stones and gravel frequently damage not only the high-strength PE film and the adhesive PE film that are physically weak but also the galvanized steel underneath the PE film.

Accordingly, to improve the strength of the polymer film layer and the strength of the corrugated steel pipe, a polymer film layer in which an intermediate reinforcing material such as a non-woven fabric is disposed between the adhesive film layer and the high-strength film layer has been developed. However, this existing polymer film layer has a problem in that the adhesive strength between the nonwoven fabric and the adhesive film layer and the adhesive strength between the nonwoven fabric and the high-strength film layer are insufficient, resulting in film peeling on or underneath the nonwoven fabric.

In addition, the high-strength film layers made of polymer and formed on the outer and inner surfaces of the corrugated steel pipe cannot sufficiently cushion the impact from external shocks or foreign substances such as stones and gravel mixed in the fluid flowing through the corrugated steel pipe. Thus, the lifespan of the product is shortened. As well, in terms of productivity, since new facilities need to be installed, there are problems in that the manufacturing cost rises considerably and the mass production efficiency decreases.

Therefore, the development of a new polymer film layer exhibiting sufficient strength when applied on a steel pipe, providing sufficient buffering against external impacts, being difficult to peel off, and improving productivity of work is required.

DOCUMENTS OF RELATED ART

Patent Document (Patent Document 1) Korea Patent No. 10-1824002 (registered as of Jan. 25, 2018)

SUMMARY OF THE INVENTION

The present disclosure provides a composite film for steel coating and a method of manufacturing the same, the composite film being coated on a steel member such as a steel pipe or a steel plate to improve the strength and durability of the steel member. The composite film has uniform quality over the entire area thereof, and has high adhesive strength to the steel member. Therefore, the composite film does not easily peel off even when applied on a steel member having a complicated shape such as a corrugated steel pipe.

One embodiment of the present disclosure for achieving the objective as described above, relates to a composite film for surface protection and reinforcement of a steel member.

The composite film includes: a first film layer attached to an upper portion of a steel member; a second film layer positioned on the first film layer; and a mesh film layer having a mesh structure and positioned on the second film layer.

A portion of the mesh film layer may be embedded in the second film layer during a heat compression process when the composite film is manufactured.

The first film layer may be made from a first polymer mixture including a PE polymer and maleic anhydride.

The second film layer may be made from a first polymer mixture including a PE polymer and maleic anhydride.

The mesh film layer may be woven with synthetic resin yarn.

The synthetic resin yarn may include HDPE and an inorganic filler.

It is preferable that the specific gravity of the synthetic resin yarn is greater than the specific gravity of the second polymer mixture.

The PE polymer included in the first film layer and the second film layer may be LLDPE.

Another embodiment of the present disclosure relates to a method of manufacturing a composite film for steel coating, the method including: preparing a laminate in which a first film layer 11 and a second film layer 12 that are in an uncured state are laminated; applying a mesh film layer 12 on the second film layer 12 and compressing the mesh film layer 12 to prepare a composite film 10 in which a portion of the mesh film layer 13 is embedded in the second film layer 12; and cooling the composite film 10.

The first film layer and the second film layer may include a PE polymer.

The manufacturing of the laminate may include: preparing the first film layer by heating and extruding a first polymer mixture into a molded article with a film shape; preparing the second film layer by heating and extruding a second polymer mixture into a molded article with a film shape; and laminating the first film layer and the second film layer.

The first polymer mixture may include a PE polymer and maleic anhydride.

The steel coating composite film of the present disclosure can prevent oxidation and corrosion of a steel member when applied on the steel member, has good strength, and has good adhesion to a steel member, thereby enabling the durability of a steel member to be stably maintained for a long period of time.

In addition, the steel coating composite film is composed of a first film layer, a second film layer, and a mesh film layer, in which the mesh film layer is partially embedded in the second film layer, and the mesh film layer is exposed on the outermost surface. Thus, the durability of the steel coating composite film can be improved.

In addition, since the first film layer, the second film layer, and the mesh film layer are tightly bonded to each other, the film layers are not easily separated from each other.

BRIEF DESCRIPTION OF THE DRAWINGS

The FIGURE is a view schematically illustrating a cross-section of a steel member with one surface coated with a steel coating composite film according to one embodiment of the present disclosure.

DESCRIPTION OF THE PREFERRED EMBODIMENTS

Prior to describing preferred embodiments of the present disclosure, it should be noted that the terms and words used in the present specification and the appended claims should not be construed as limited to conventional or dictionary meanings but should be construed as meaning and concept consistent with the technical idea of the present disclosure.

It will be further understood that the terms "comprises" and/or "comprising", "includes" and/or "including", and "has" and/or "having", when used in this specification, specify the presence of stated features, regions, integers, steps, operations, elements, and/or components, but do not preclude the presence or addition of one or more other features, regions, integers, steps, operations, elements, and/or components.

It will be understood that, although the identification symbols may be used herein to describe various steps, the terms are used only for distinguishing one element step from another step, and the essence, sequence, or order of the steps are not limited by the terms. Therefore, unless explicitly stated for the order of each step, the steps may be performed in a different order from the order in which the steps are described or termed. That is, each of the steps may be performed in the same order as described herein, substantially simultaneously, or in reverse order.

Herein after, embodiments of the present disclosure will be described. However, the scope of the present disclosure is not limited to the preferred embodiments described below, and those skilled in the art may implement various modified forms of the contents described herein without departing from the scope of the present disclosure.

The present disclosure relates to a steel-coating composite film for steel coating and a manufacturing method thereof, in which the steel-coating composite film of the present disclosure may be applied on a steel member to improve corrosion resistance and durability of the steel member.

One embodiment of the present disclosure relates to a film composite for coating a steel member.

Here, the steel member is a product made of steel, and examples of the steel member include a steel plate and a steel pipe. Some of the steel members may include a galvanized layer formed on the surface thereof.

The FIGURE is a view schematically illustrating a cross-section of a steel member with one surface coated with a steel-coating composite film according to one embodiment of the present disclosure.

The steel-coating composite film 10 according to an embodiment of the present disclosure is used to protect or reinforce the surface of a steel member 20. The composite film includes a first film layer 11 attached to an upper surface of a steel material 20, a second film layer 12 positioned on the first film layer 11, and a mesh film layer 13 having a mesh structure and positioned on the second film layer 12.

A portion of the mesh film layer 13 may be embedded in the second film layer 12 during a heat compression process when the composite film is manufactured. Therefore, the mesh film layer 13 is strongly fixed to form an integrated composite film.

Among the layers constituting the composite film 10, the first film layer 11 is formed to attach the composite film 10 to the steel member, and the second film layer 12 is formed for surface protection and reinforcement of the steel member 20 by having a predetermined strength and being formed to cover the entire surface of the steel member. The mesh film layer 12 is formed in the form of a mesh and functions to increase the strength of the composite film 10.

The first film layer 11 and the second film layer 12 contain a polyethylene (PE) polymer and, more preferably, contain a linear low density polyethylene (LLPE) polymer. Therefore, the adhesive strength between the first film layer 11 and the second film layer 12, the adhesive strength of the film layers 11 and 12 to the steel member 20, and the adhesive strength of the film layers 11 and 12 to the mesh film layer 13 are very good. For this reason, the composite film 10 is unlikely to peel off from the steel member 20, and delamination of the composite film 10 may be prevented. Therefore, more effective and long-term steel protection and reinforcement effect can be maintained.

The first film layer 11 is formed to provide adhesion between the composite film 10 and the steel member 20.

The first film layer 11 may have a thickness of 0.01 to 0.1 mm. When the thickness is less than 0.01 mm, it is difficult to secure sufficient adhesive strength. On the other hand, when the thickness exceeds 0.1 mm, the adhesive strength is rather reduced. Therefore, it is preferable that the thickness is in the range.

The first film layer 11 may be formed from a first polymer mixture in which PE and maleic anhydride are mixed. The first film layer 11 may be obtained by molding the first polymer mixture into a film shape.

The first polymer mixture includes a PE polymer, maleic anhydride, and a masterbatch for improving the function. Specifically, the first polymer mixture includes 50 to 85 wt % of PE polymer, 12 to 45 wt % of maleic anhydride, and 2 to 5 wt % of masterbatch.

The PE polymer exhibits fundamental physical properties, for example, adhesion, strength, chemical resistance, and the like for the first polymer mixture. In particular, the PE polymer exhibits high impact strength even at low temperatures, has excellent abrasion resistance, chemical resistance, and corrosion resistance, and has a low level of moisture water absorption. Therefore, when the PE polymer is applied to a pipe that transports water, it is possible to prevent the pipe from being damaged by water.

Preferably, linear low density polyethylene (LLDPE) may be used as such a PE polymer. Since the LLDPE has significantly superior adhesion and flexibility compared to high density polyethylene (HDPE), the LLDPE can be strongly attached to even an uneven or curved surface of a steel member. This is because the composite film 10 has the advantage of preventing damage to the composite film 10 in the molding process of producing the coated steel member.

The PE polymer may be contained in an amount of 50 to 85 wt % in the first polymer mixture. When the content of the PE polymer is less than 50 wt %, the strength, flexibility, and adhesiveness of the first film layer 11 cannot be exhibited, resulting in a problem in that it is difficult to form the first film layer 11 having a film shape due to insufficient moldability. On the other hand, when the content of the PE polymer exceeds 85 wt %, there is a problem in that the adhesion or strength of the first film layer 11 is lowered because the content of the maleic anhydride or the masterbatch is relatively low.

The maleic anhydride is a component added to improve the adhesion of the first film layer 11 to different materials. In general, adhesive polymers have very good adhesion to the same material, but have relatively weak adhesion to different materials. Therefore, according to the present disclosure, maleic anhydride is used to increase the adhesion between the first film layer 11 and steel, which is a different material from the first film layer.

The maleic anhydride may be contained in the first polymer mixture in an amount of 12 to 45 wt %. When the content of the maleic anhydride is less than 12 wt %, the effect of improving the adhesion is insignificant. On the other hand, when the content exceeds 45 wt %, since the content of the PE polymer or the masterbatch is reduced, the strength or adhesiveness of the first film layer 11 may become poor. Therefore, it is preferable that the content of the maleic anhydride is in the weight range.

The masterbatch is a component added to improve the strength of the first polymer mixture and to impart a color to the first polymer mixture. The masterbatch may be contained in an amount of 2 to 5 wt % in the first polymer mixture. When the masterbatch is contained in an amount within the weight range, it is possible to increase the strength of the first film layer 11 while not deteriorating the adhesiveness.

The masterbatch may contain 63 to 79 wt % of a PE polymer, 20 to 36 wt % of carbon black, and 0.1 to 1.2 wt % of acetic acid. The PE polymer contained in the masterbatch may be the same as the PE polymer contained in the first polymer mixture. More preferably, this is because the PE polymer functions to help the masterbatch to be homogeneously mixed with the first polymer mixture.

The carbon black is a component added to impart color and increase the strength of the first film layer 11. The carbon black may be added in an amount of 20 to 36 wt %. When the content of the carbon black is less than 20 wt %, the effect of improving the strength and color expression of the first film layer 11 is insignificant because the content of carbon black is insufficient. On the other hand, when the content of the carbon black exceeds 36 wt %, since the content of the carbon black in the masterbatch is high, it is difficult to achieve uniform mixing in the first polymer mixture, and the flexibility of the first film layer 11 may be reduced. Therefore, the carbon black is preferably contained in an amount within the mentioned weight range.

The acetic acid is a component added to increase the miscibility of carbon black and PE polymer. The acetic acid may be contained in an amount of 0.1 to 1.2 wt %. When the content of the acetic acid is less than the lower limit of the weight range, the effect of improving the miscibility is insignificant, whereas when the content of the acetic acid exceeds the upper limit of the weight range, the frictional force on the surface of the first film layer 11 is reduced, and the first film layer 11 is rolled out, resulting in deterioration of adhesive strength. Therefore, the content of the acetic acid is preferably within the mentioned weight range.

The second film layer 12 is formed to cover the surface of the steel member 20 with the first film layer 11 interposed therebetween and increases the water resistance, chemical resistance, corrosion resistance, and wear resistance of the steel member 20, thereby protecting the surface of the steel member 20. That is, the second film layer 12 improves the durability of the steel member 20.

The second film layer 12 may be formed to a thickness of 0.1 to 0.5 mm. When the thickness of the second film layer 12 is less than 0.1 mm, the strength of the second film layer 12 is low so that the composite film 10 is easily damaged. When the thickness exceeds 0.5 mm, since the second film layer 12 is excessively thick, there is a problem that the second film layer 12 easily peels off, and thus the composite film 10 is easily separated from the steel member 20. Therefore, it is preferable that the thickness of the second film layer 12 is within the mentioned range.

The second film layer 12 may be formed from a second polymer mixture including a PE polymer. The second film layer 12 may be obtained by molding the second polymer mixture into a film shape.

The second polymer mixture may include 95 to 99 wt % of the PE polymer and 1 to 5 wt % of the masterbatch.

In this case, the PE polymer contained in the second film layer 12 may be linear low density polyethylene (LLDPE). The LLDPE has excellent adhesion and flexibility as have already been described. Since it is the same material as the PE polymer used for the first film layer 12, the adhesive strength between the first film layer 11 and the second film layer 12 is high.

In particular, it is more preferable to use the LLDPE as the PE polymer to be included in the second film layer 12. In the case of LLDPE, the structure is similar to that of the PE polymer constituting the first film layer 11, thereby providing a stronger adhesive strength. In addition, the mesh film layer 13 can be embedded in a more uniform shape into the second film layer 12, and the mesh film layer 13 and the second film layer 12 can be strongly coupled to each other.

Specifically, since LLDPE has a melt index 3 to 4 times higher than HDPE, the LLDPE has good moldability. Therefore, when the mesh film layer 13 is heat-pressed on the second film layer 12 for manufacturing the composite film 10, the mesh film layer 13 can be uniformly embedded in the second film layer 12.

In addition, since LLDPE has a smaller specific gravity than HDPE, the difference in specific gravity with the mesh film layer 130 is large, so that after a portion of the mesh film layer 13 is embedded into the second film layer 12 in the heat compression process, the mesh film layer 13 is unlikely to float to the top of the second film layer 12 and remains buried in a uniform depth. Therefore, the adhesion between the mesh film layer 130 and the second film layer 12 is strong, thereby preventing the mesh film layer 130 from being partially peeled and enabling the strength of the composite film 10 to be uniform over the entire area thereof.

The PE polymer may be contained in an amount of 95 to 99 wt % in the second polymer mixture used to form the second film layer 12. When the content of the PE polymer is less than 95 wt %, the fundamental physical properties of the second film layer 12, such as adhesiveness, strength, and flexibility, may be reduced. On the other hand, when the content of the PE polymer exceeds 99 wt %, there is a problem that the effect of improving color expression and strength of the masterbatch is insignificant.

The masterbatch contained in the second polymer mixture is the same as that contained in the first polymer mixture, and it is added to impart color and improve strength.

The masterbatch may be contained in an amount of 1 to 5 wt % in the second polymer mixture. When contained in an amount less than 1 wt %, the effect of imparting color and improving strength is insignificant. When contained in an amount exceeding 5 wt %, the fundamental physical properties of the film layer 12 may be deteriorated. Therefore, it is preferable that the masterbatch is contained in an amount with in the mentioned weight range.

It is preferable that the melt index of the second polymer mixture is 1.0 g/10 min or more. When the melt index is high, the mesh film layer 13 can be uniformly and easily compressed into the second film layer 12 in the heat compression process.

The mesh film layer 13 is a net-structured film obtained by weaving synthetic resin yarns. Since the mesh film layer 13 is manufactured using HDPE as a main component, it is possible to obtain the composite film 10 having high strength and maintaining flexibility. Therefore, it is possible to improve the wear resistance and durability of the steel member 20 when the composite film 10 is applied on the surface of the steel member 20.

In addition, since the mesh film layer 13 is partially embedded in the second film layer 12, the second polymer mixture for forming the second film layer 12 infiltrates into the pores of the mesh film layer 13 in the buried region. Therefore, strong adhesion between the two film layers 12 and 13 can be obtained, and a portion of the mesh film layer 13, which is not buried in the second film layer 12 but exposed on the upper surface of the second film layer, acts as a buffer against the impact caused by foreign substances such as stones, gravel, etc. and prevents those foreign substances from directly coming into contact with the second film layer 12, thereby preventing damage to the second film layer 12. Therefore, the durability of the composite film 10 is improved.

When the mesh film layer 13 is completely embedded in the second film layer 12, the second film layer 12 comes into direct contact with the foreign substances so that the impact caused by the foreign substances is directly applied to the second film layer 12. This frequently causes abrasion of the second film layer 12, resulting in damage to the composite film 10 and shortened lifespan of the composite film.

To prevent this, it is preferable to combine the two film layers 12 and 13 in a manner that only the mesh film layer 13 is partially embedded in the second film layer 12.

The mesh film layer 13 may be formed to a thickness of 0.1 to 1.0 mm. When the thickness of the mesh film layer is less than 0.1 mm, the difficulty of the process of partially embedding the mesh film layer 13 into the second film layer 12 is excessively increased, so that the manufacturing productivity of the composite film is lowered, and it is difficult for the mesh film layer 13 has sufficient strength. On the other hand, when the thickness of the mesh film layer 13 exceeds 1.0 mm, since the flexibility of the mesh film layer 13 is low, flexible bending conforming to the shape of the steel member 20 is difficult, resulting in a problem occurring in the coating process.

As described above, the mesh film layer 13 is a net-structured film obtained by weaving synthetic resin yarns.

The cross-sectional diameter of the synthetic resin yarn used to form the mesh film layer 13 may be in the range of 0.15 to 0.22 mm. When the diameter is less than 0.15 mm, it is difficult to form the mesh film layer 13 having a predetermined thickness, and the strength of the mesh film layer 13 is lowered. When the diameter exceeds 0.22 mm, there is a problem in that the mesh film layer 13 is excessively thick.

The porosity of the mesh film layer 13 may be in the range of 50% to 78%. When the porosity is less than 50%, the flexibility of the mesh film layer 13 may be poor, and molding may be difficult to perform. Even though the composite film is applied on the steel member 20, the mesh film layer 13 may peel off due to an extremely large difference in flexibility between the mesh film layer 13 and each of the other film layers 11 and 12.

On the other hand, when the porosity exceeds 78%, it may be difficult for the mesh film layer 13 to have sufficient strength.

In addition, the size of the pores formed in the mesh film layer 13 may be in the range of 0.5 to 1.2 mm. When the size of the pores is smaller than 0.5 mm, it is difficult for the second polymer mixture for forming the second film layer 12 to infiltrate into the pores of the mesh film layer 13, resulting in poor uniformity in the bonding force between the two film layers 12 and 13. When the size of the pores is larger than 1.2 mm, the effect of improving reinforcement, which can be obtained by the mesh film layer 13, is insignificant. Therefore, it is preferable to use the mesh film layer 13 having the size of pores within the mentioned range.

The mesh film layer 13 may have 19 to 22 weft yarns per inch and 23 to 26 warp yarns per inch. It is preferable that the number of weft yarns per inch is greater than the number of warp yarns.

In addition, when the number of weft yarns per inch and the number of warps per inch of the mesh film layer 13 are less than the lower limit of the range, it is difficult for the mesh film layer 13 to provide sufficient strength. When the numbers exceed the upper limit of the range, the flexibility of the mesh film layer 13 is excessively reduced.

In addition, the porosity and pore size of the mesh film layer 13 are excessively small, thereby making the mesh film layer 13 difficult to be embedded into the second film layer 12. Specifically, in the process of embedding the mesh film layer into the second film layer 12 through compression, the uncured second film layer 12 does not stably flow into the pores of the mesh film layer 13, so that the second film layer 12 is rolled out, resulting in non-uniformity in the thickness of the second film layer 12, thereby deteriorating the strength and physical and chemical properties of the composite film 10.

The synthetic resin yarn for forming the mesh film layer 13 may contain 98.5 to 99.9 wt % of HDPE and 0.1 to 1.5 wt % of an inorganic filler.

The mesh film layer 13 is to increase the strength and abrasion resistance of the composite film 10. Therefore, the mesh film layer 13 is preferably formed from a HDPE material having high hardness and strength. Since the mesh film layer is formed in the form of a net structure using HDPE yarns, even though the hardness of the mesh film layer is high, the mesh film layer 13 may have flexibility unlike a void-free film layer such as the first film layer 11 or the second film layer 12.

The inorganic filler is used to increase the strength and specific gravity of the synthetic resin yarn. Since the abrasion resistance of the mesh film layer 13 is strengthened by the addition of the inorganic filler, the mesh film layer 13 may not be easily damaged even when repeated external impacts are applied thereto.

In addition, since the specific gravity of the mesh film layer 13 is increased due to the addition of the inorganic filler, a portion the mesh film layer 13 is embedded into the second film layer 12 by pressure in the heat compression process for bonding the mesh film layer 13 and the second film layer 12 to each other, and the embedded state can be maintained even though the pressing force is removed due to the difference in specific gravity.

For imparting these properties, the inorganic filler is preferably contained in an amount of 0.1 to 1.5 wt % in the synthetic resin yarn. When the inorganic filler is contained in an amount of less than 0.1 wt %, the above-described effect is not obtained. When the inorganic filler is contained in an amount exceeding 1.5 wt %, since the specific gravity of the mesh film layer 13 is excessively large, when the pressing force applied during the heat compression process is removed, the mesh film layer 13 continues to sink into the second film layer 12, and thus in some areas, the mesh film layer 13 is completely buried inside the second film layer 12. In this case, there is a problem that the second film layer 12 is exposed on the top surface. Therefore, it is preferable that the content of the inorganic filler is within the weight range mentioned above.

Stone powder obtained by pulverizing stones such as granite, limestone, basalt, or waste stone to a predetermined particle size may be used as the inorganic filler.

Preferably, stone powder having an average particle size of 10 to 90 µm may be used. When the average particle size of the stone powder is less than 10 µm, the inorganic fillers agglomerate with each other in the process of mixing the HDPE, so that homogeneous mixing cannot be achieved. When the average particle size exceeds 90 µm, since the particle size of the stone powder is excessively large, the particles of the powder protrude from the surface of the synthetic resin yarns and the stone powder is likely to be detached, thereby reducing the durability of the yarns. Therefore, it is preferable to use stone powder having the average particle size within the mentioned range.

It is preferable that the specific gravity of the synthetic resin yarns constituting the mesh film layer 13 is greater than the specific gravity of the second polymer mixture constituting the second film layer 12.

More specifically, it is preferable that the specific gravity of the synthetic resin yarns is 0.02 or more greater than the specific gravity of the second polymer mixture constituting the second film layer 12. When the difference in specific gravity between them is less than 0.02, the mesh film layer 13 is not easily buried into the second film layer 12 during the heat compression process, and even though buried, the mesh film layer 13 resurfaces in some areas after being buried into the second film layer. In this case, the composite film is not uniform in thickness over the entire area, resulting in poor uniformity in strength. This is because the adhesion between the second film layer 12 and the mesh film layer 13 is deteriorated in the region in which the resurfacing occurs.

When the composite film 10 may be applied on one or both surfaces of the steel member 20, the composite film 10 improves the water resistance, chemical resistance, abrasion resistance and durability of the steel member, thereby protecting and reinforcing the steel member 20.

On the other hand, another embodiment of the present disclosure relates to a method of manufacturing a composite film for steel coating. Since the composite film 10 according to one embodiment of the present disclosure can be manufactured through this method, the redundant description will be omitted.

A method of manufacturing a composite film for steel coating, according to another embodiment of the present disclosure, includes: preparing a laminate in which a first film layer 11 and a second film layer 12 that are uncured are laminated; applying a mesh film layer 12 on the second film layer 12 and compressing the mesh film layer 12 to prepare a composite film 10 in which a portion of the mesh film layer 13 is embedded in the second film layer 12; and cooling the composite film 10.

In the step of preparing the laminate in which the first film layer 11 and the second film layer 12 that are uncured are laminated includes: a first film layer preparation step in which a first polymer mixture, which is a raw material of the first film layer 11, is heated to a temperature in the range of 150° C. to 235° C. and extruded into a film, which is the first film layer 11; a second film layer preparation step in which a second polymer mixture, which is a raw material of the second film layer 12, is heated to a temperature in the range of 150° C. to 235° C. and extruded into a film, which is the second film layer 12; and a lamination step in which the first film layer 11 and the second film layer 12 are bonded to each other.

The first film layer 11 and the second film layer 12 may be laminated after being manufactured in a film shape and then be arranged side by side in the vertical direction. In the lamination step, it is preferable that the first film layer 11 and the second film layer 12 be laminated in an uncured state in a temperature range of 220° C. to 240° C. The thickness of the laminate may be adjusted according to the pressing force in the lamination step.

In this case, for example, in the lamination step, the upper surface of the second film layer 12 may be treated to have an uneven surface, thereby producing a film having an embossed surface. As such, when the upper surface of the second film layer 12 has an embossed structure, effects such as external shock relief, adhesion assurance (prevention of peeling), film damage prevention, tensile resistance, durability, abrasion resistance, corrosion resistance, and rigidity improvement can be obtained As described above, to form the embossed surface, heat, pressure, ultraviolet rays, or electron beams may be applied to the upper surface of the second film layer 12, or the upper surface is treated with chemicals or resin.

On the other hand, the laminate produced through the lamination step is combined with the mesh film layer 13 to form the composite film 10.

Specifically, the mesh film layer 13 is applied on the second film layer 12 of the laminate formed through the lamination step, and pressed with a pressing device such as a pressure roller. Through this method, the composite film 10 in which a portion of the mesh film layer 13 is embedded in the second film layer 12 can be manufactured.

The laminate is still maintained at a high temperature due to the heat applied in the lamination step. Since the laminate is in an uncured state, a portion of the mesh film layer 13 can be sunk into the second film layer 12 by the pressing force. Thus, the composite film 10 into which the first film layer 11, the second film layer 12, and the mesh film layer 13 are integrated can be manufactured.

In the step of combining the laminate with the mesh film layer 13, heat is provided from the laminate. When the temperature of the laminate is maintained continuously, after the mesh film layer 13 is combined with the laminate, the composite film 10 may be deformed. Therefore, in this step, it is preferable to use a cooler so that the operating temperature can be maintained at a temperature in the range of 45° C. to 80° C.

When such a low temperature is maintained, since the embedding of the composite film 10, the cooling of the composite film 10, and the curing of the first film layer 11 and the second film layer 12 proceed simultaneously, the mesh film layer 13 is partially buried in the second film layer 12 in the integrated film. That is, the mesh film layer 13 is not completely buried into the second film layer 12 or does not resurface to the top of the second film layer 12, but the state in which the mesh film layer 13 is only partially buried in the second film layer 12 can be maintained.

Next, the step of adjusting the flatness of the composite film 10 and the step of adjusting the tension of the film may be further performed as needed. In this case, when the second film layer 12 is formed to have an embossed surface, these steps may be omitted.

Next, the step of cooling the composite film 10 is performed. As a cooling method, a variety of known methods may be used. Preferably, a natural cooling method or an air cooling method may be used. Alternatively, a method of cooling a transporting device that transfers the composite film 10 by air cooling or water cooling may be used.

Immediately before, immediately after, or at the same time as the cooling step, the step of attaching a release film (not shown) to the lower surface of the first film layer 11 may be further performed.

Finally, a winding step of winding the composite film 10 on which the release film (not shown) is attached in the form of a roll may be performed.

Hereinafter, specific actions and effects of the present disclosure will be described with reference to examples. However, the examples are presented for only illustrative purposes, the scope of the present disclosure is not limited by the examples described below.

Preparation Example

First, a synthetic resin yarn with a diameter of 0.19 mm was prepared by mixing 99.4 wt % of HDPE polymer and 0.6 wt % of limestone powder with an average particle size of 20 to 50 μm as an inorganic filler. The yarns were weaved at a density of 21 wefts per inch and 24 warps per inch to prepare a mesh film layer having a pore size of 0.8 to 1.0 mm, a porosity of 70%, and a thickness of 0.5 mm.

Next, the first polymer mixture was prepared by mixing 67 wt % of LLDPE polymer, 29 wt % of maleic anhydride, and 4 wt % of masterbatch, and the second polymer mixture was prepared by mixing 97 wt % of LLDPE polymer and 3 wt % of masterbatch. The same masterbatch was used for the first polymer mixture and the second polymer mixture. As the masterbatch, a pellet-type masterbatch containing 74 wt % of LLDPE polymer, 25 wt % of carbon black, and 1 wt % of acetic acid was used.

Next, the first film layer and a second film layer were prepared from the first polymer mixture and the second polymer mixture through molding, respectively. The first film layer and the second film layer were compressed so that the two film layers are bonded to each other. In a state in which the two film layers remain uncured, the mesh film layer is supplied onto the second film layer and compressed using a roller to prepare a composite film of Example 1 in which the mesh film layer is partially embedded in the second film layer in the integrated composite film.

Experimental Example 1

After the composite film 10 of Example 1 was applied on a corrugated steel pipe, adhesion, permeation resistance, and impact resistance were measured, and pinhole test and appearance observation were performed. The results are shown in Table 1. In each test, measurement was performed according to ASTM A742, and the temperature was maintained within an error range of 1° C. during the test.

TABLE 1

| Test item | | Example 1 |
|---|---|---|
| Adhesion | −18° C. | Normal |
| | 25° C. | Normal |
| | 50° C. | Normal |
| Permeation resistance | 10% NaCl aqueous solution, 23° C., 48 h | Normal |
| | 30% H$_2$SO$_4$ aqueous solution, 23° C., 48 h | Normal |
| | 10% NaOH aqueous solution, 23° C., 48 h | Normal |
| Impact resistance | 4.0 J | Normal |
| Pin hole test | 67.5 V | Normal |
| Appearance | | Normal |

Referring to the experimental results in Table 1, it was confirmed that the composite film 10 of Example 1 had excellent adhesion at low temperature, room temperature, and high temperature and had excellent permeation resistance and impact resistance, no pinholes, and good appearance.

Experimental Example 2

A composite film 10 of Comparative Example 1 was prepared in the same manner as in Example 1, except that the LLDPE polymer included in the second polymer mixture was changed to an HDPE polymer.

Then, the strength and thickness of the composite film 10 of Example 1 and the composite film 10 of Comparative Example 1 were measured, and the results are shown in Table 2.

The strength was measured using the tensile strength (yield point) measurement method according to ASTM D638, and the thickness was measured at random 25 places to check the maximum thickness, the minimum thickness, and the thickness standard deviation.

TABLE 2

|  | Example 1 | Comparative Example 1 |
|---|---|---|
| Tensile strength (kgf/cm$^2$) | 238 | 242 |
| Minimum thickness (mm) | 0.747 | 0.820 |
| Maximum thickness (mm) | 0.764 | 0.693 |
| Average thickness (mm) | 0.758 | 0.766 |

TABLE 2-continued

|  | Example 1 | Comparative Example 1 |
|---|---|---|
| Standard deviation of thickness | 0.006 | 0.028 |

Referring to the results of Table 2, it was confirmed that the difference in tensile strength between Example 1 and Example 2 was not large, and the type of polymer used for the second film layer 12 did not significantly affect the strength. Referring to the thickness measurement results, in Example 1, the thickness was uniformly formed over the entire area, but in Comparative Example 1, it was confirmed that the thickness difference for each area was large compared to that of Example 1.

The reason is because the melt index of HDPE is high, the moldability is poor, and the mesh film layer 13 is not uniformly embedded over the entire area due to the high density.

Therefore, it was confirmed that it is preferable to use LLDPE as the PE polymer for the second polymer mixture to ensure uniform quality of the composite film 10.

Experimental Example 3

A composite film 10 was prepared using the same method as in Preparation Example, but the content of an inorganic filler added during the preparation of a mesh film layer 13 was changed as shown in Table 3 below.

The specific gravity A of the second polymer mixture of the second film layer 12 was measured, and the specific gravity B of the synthetic film yarn constituting the mesh film layer 13 was measured. The difference (B-A) between the two specific gravity values was calculated. The results are shown in Table 3.

Thereafter, the thickness and tensile strength of each composite film 10 were measured in the same manner as in Experimental Example 2, and the elongation was measured according to ASTM D638. The results are shown in Table 3.

In addition, after the composite films 10 were coated on respective corrugated steel pipes having the same specifications, an accelerated aging test was performed for 97 days under a temperature condition of 53±2° C. After that, the tensile strength and elongation were measured. The results are shown in Table 3.

TABLE 3

| Specimen No. | Content of inorganic filler (wt %) | Specific gravity difference (B - A) | Thickness (mm) Average | Thickness (mm) Standard deviation | Tensile strength (kgf/cm2) Before aging | Tensile strength (kgf/cm2) After aging | Elongation (%) Before aging | Elongation (%) After aging |
|---|---|---|---|---|---|---|---|---|
| # 1 | — | 0.014 | 0.816 | 0.039 | 219 | 135 | 500 or more | 500 or more |
| # 2 | 0.05 | 0.017 | 0.802 | 0.034 | 223 | 159 | 500 or more | 500 or more |
| # 3 | 0.12 | 0.022 | 0.753 | 0.007 | 235 | 211 | 500 or more | 500 or more |
| # 4 | 0.30 | 0.028 | 0.756 | 0.008 | 233 | 213 | 500 or more | 500 or more |
| # 5 | 0.60 | 0.033 | 0.758 | 0.006 | 238 | 216 | 500 or more | 500 or more |
| # 6 | 1.00 | 0.043 | 0.755 | 0.007 | 228 | 217 | 500 or more | 500 or more |
| # 7 | 1.42 | 0.048 | 0.756 | 0.007 | 230 | 215 | 500 or more | 500 or more |
| # 8 | 1.55 | 0.060 | 0.739 | 0.016 | 244 | 221 | 476 | 384 |

Referring to the results of Table 3, in the case of Specimens 3 to 7, the average thickness was uniform, the standard deviation was small, and both the tensile strength and elongation before and after the aging were excellent. In the case of Specimen 1 and Specimen 2, the thickness variation was large, and the tensile strength was deteriorated after the aging. This is considered to be attributed to the difference in specific gravity between the mesh film layer 13, depending on the content of the inorganic filler contained in the mesh film layer 13. Specifically, in the case of Specimens 1 and 2, the problem was caused because the difference in specific gravity between the two film layers is significantly small, and thus the lower surface of the mesh film layer 13 is not uniformly buried into the second film layer 12.

From the results of this experiment, it was confirmed that the difference in specific gravity between the second polymer mixture constituting the second film layer 12 and the synthetic resin yarn constituting the mesh film layer 13 was preferably 0.2 or more to prevent this problem.

On the other hand, in the case of Specimen 8, the thickness standard deviation was found to be good, but it was observed that the mesh film layer 13 was completely embedded into the second film layer 12 in some regions. In this case, since the second film layer 12 is located as the uppermost layer, the abrasion resistance of the composite film 10 may be reduced.

In addition, in the case of Specimen 8, it was found that the elongation was significantly lowered than that of the other specimens, which is considered to be a problem caused by excessively high content of inorganic filler.

Therefore, from the results of this experiment, the content of the inorganic filler contained in the synthetic resin yarn constituting the mesh film layer 13 is preferably in the range of 0.1 to 1.5 wt % to make a structure in which the mesh film layer 13 is partially embedded in the second film layer 12.

More preferably, it was confirmed that the difference in specific gravity between the second polymer mixture constituting the second film layer 12 and the synthetic resin yarn constituting the mesh film layer 13 was preferably 0.2 or more.

Experimental Example 4

A first film layer 11 was prepared in the same manner as in Example 1, except that the content of maleic anhydride added during the preparation of the first polymer mixture was changed as shown in Table 4 below. The amount of maleic anhydride was adjusted such that the total amount was the same by increasing or reducing the content of the PE polymer.

Next, an adhesive strength test for each specimen was performed by the method according to ASTM D903, and the results are shown in Table 4.

TABLE 4

| Specimen No. | Content of maleic anhydride (wt %) | Adhesive strength (kg/cm²) |
| --- | --- | --- |
| # 9 | — | 3.96 |
| # 10 | 10.0 | 4.04 |
| # 11 | 13.6 | 5.54 |
| # 12 | 29.0 | 5.83 |
| # 13 | 33.5 | 6.02 |
| # 14 | 44.4 | 5.92 |
| # 15 | 46.1 | 4.39 |

Referring to the results shown in Table 4, when maleic anhydride was included in the first polymer mixture, it was confirmed that the adhesive strength was increased. In particular, it was confirmed that Specimens 11 to 14 exhibited relatively high adhesive strength. In the case of Specimen 10, the content of maleic anhydride was small, so that no significant increase in adhesive strength was observed. In the case of Specimen 15, the content of maleic anhydride was excessively large, and it was determined that the adhesive strength of the first film layer 11 was reduced due to the excessive content. Therefore, it is confirmed from the results of this experiment that maleic anhydride is preferably contained in the first polymer composition in an amount of 12 to 45 wt %.

Experimental Example 5

A galvanized steel sheet was prepared, a galvanized steel sheet without any coating was prepared as Specimen 16. The composite film 10 of Example 1 was applied on the zinc layer to prepare Specimen 17. In addition, the composite film of Comparative Example 2 was applied to prepare Specimen 18, and the composite film of Comparative Example 3 was applied to prepare Specimen 19.

In this case, the composite film of Comparative Example 2 was prepared in the same manner as the composite film 10 of Example 1, except that maleic anhydride was not included in the first polymer mixture, an HDPE polymer was used as the PE polymer of the second polymer mixture, and a composite film in which inorganic fillers were not contained in the mesh film layer was used.

In addition, as the composite film of Comparative Example 3, the same composite film as the composite film of Comparative Example 2 was used except that the mesh film layer was not included.

Next, 5 pieces for each of Specimens 16 to 19 were prepared. A wear test was performed on each specimen by the method according to ASTM D4060. The average wear characteristics for each specimen is shown in Table 5.

Abrasion resistance was evaluated on the basis of the number of cycles of the abrasive wheel. In the abrasion test results of Table 5, the number of rotations when the coating layer is completely damaged or equivalent is shown. When no noticeable damage occurs even after the number of rotations exceeds a predetermined value, the performance is expressed as "0 or more".

TABLE 5

| Specimen No. | Initial coating average thickness (μm) | Average thickness of coating after test (μm) | Result of abrasion test (cycle) |
| --- | --- | --- | --- |
| # 16 | 32 | 4 | 8,000 |
| # 17 | 601 | 408 | 100,000 or more |
| # 18 | 592 | 296 | 80,000 or more |
| # 19 | 336 | 24 | 40,000 |

Referring to the test results in Table 5, it was found that a steel plate was easily damaged in the case of Specimen 16 in which no polymer coating layer was formed. In addition, it was confirmed that the abrasion performance was significantly improved in the case of Specimens 17 to 19 in which the mesh film layer was included. Especially, when an inorganic filler was included in the mesh film layer, LLDPE was used as the PE polymer of the second polymer mixture, and maleic anhydride was included in the first polymer mixture as in one embodiment of the present disclosure, it was confirmed that the abrasion performance was further improved.

The present disclosure is not limited to the above-described specific embodiments and description, and various changes and modifications thereof may be made without departing from the scope of the present disclosure as defined in the appended claims by those skilled in the art. In addition, such variations may fall within the protection scope of the present disclosure.

What is claimed is:

1. A composite film for surface protection and reinforcement of a steel member, the composite film comprising:
a first film layer attached to a surface of a steel member;
a second film layer positioned on the first film layer; and
a mesh film layer having a mesh structure and positioned on the second film layer,
wherein the first film layer is made from a first polymer mixture comprising 50 to 85 wt % of a linear low density polyethylene (LLDPE) 12 to 45 wt % of maleic anhydride, and 2 to 5 wt % of masterbatch,
the second film layer is made from a second polymer mixture comprising a linear low density polyethylene (LLDPE),
the mesh film layer is formed by weaving synthetic resin yarns containing a high density polyethylene (HDPE) and 0.12 to 1.42 wt % of an inorganic filler,
the mesh film layer is partially embedded into the second film layer during a heat compression process when the composite film is manufactured, and
the inorganic filler of the mesh film layer is a stone powder having an average particle size of 10 to 90 μm.

2. The composite film of claim 1, wherein the synthetic resin yarn has a specific gravity higher than that of the second polymer mixture.

3. The composite film of claim 1, wherein the masterbatch of the first polymer mixture comprises 63 to 79 wt % of a polyethylene (PE) polymer, 20 to 36 wt % of carbon black, and 0.1 to 1.2 wt % of acetic acid.

4. The composite film of claim 1, wherein the second polymer mixture further comprises 1 to 5 wt % of masterbatch.

5. The composite film of claim 4, wherein the masterbatch of the second polymer mixture and the masterbatch of the first polymer mixture have the same composition.

6. The composite film of claim 1, wherein a melt index of the second polymer mixture is 1.0 g/10 min or more.

7. The composite film of claim 1, wherein a cross-sectional diameter of a synthetic resin yarn of the mesh film layer is in a range of 0.15 to 0.22 mm.

8. The composite film of claim 1, wherein a porosity of the mesh film layer is in a range of 50% to 78%.

9. The composite film of claim 1, wherein a size of pores of the mesh film layer is in a range of 0.5 to 1.2 mm.

10. The composite film of claim 1, wherein the mesh film layer has 19 to 22 weft yarns per inch and 23 to 26 warp yarns per inch.

11. The composite film of claim 1, wherein a specific gravity of a synthetic resin yarns constituting the mesh film layer is greater than a specific gravity of the second polymer mixture constituting the second film layer.

12. The composite film of claim 1, wherein a specific gravity of a synthetic resin yarns constituting the mesh film layer is 0.02 or more greater than a specific gravity of the second polymer mixture constituting the second film layer.

13. A method of manufacturing a composite film of claim 1, the method comprising:
preparing a non-cured laminate in which a first film layer and a second film layer are stacked;
preparing a composite film by applying and pressing a mesh film layer on the second film layer such that the mesh film layer is partially embedded into the second film layer; and
cooling the composite film,
wherein the preparing of the laminate comprises a first film layer preparation step of heating and extruding a first polymer mixture into a film shape, a second film layer preparation step of heating and extruding a second polymer mixture into a film shape, and bonding the first film layer and the second film layer to each other,
wherein each of the first film layer and the second film layer comprises a PE polymer,
wherein the first polymer mixture contains 50 to 85 wt % of the PE polymer and 12 to 45 wt % of maleic anhydride, and
wherein the mesh film layer is obtained by weaving synthetic resin yarns containing HDPE and an inorganic filler.

* * * * *